United States Patent [19]

Scheper

[11] Patent Number: 4,966,376
[45] Date of Patent: Oct. 30, 1990

[54] VEHICLE WHEEL SUSPENSION CLEARANCE DETECTOR

[76] Inventor: Halbe W. Scheper, No. 1, Groene Zoom, NL-9791 BA Ten Boer, Netherlands

[21] Appl. No.: 306,849

[22] Filed: Feb. 7, 1989

[30] Foreign Application Priority Data

Feb. 9, 1988 [NL] Netherlands ............... 8800298

[51] Int. Cl.$^5$ .......................................... B60F 25/00
[52] U.S. Cl. ................................................ 280/1
[58] Field of Search ............... 280/700, 689, 723, 721, 280/1, 661; 73/146

[56] References Cited

U.S. PATENT DOCUMENTS 3,227,238  1/1966  Strader .................................. 280/91
3,306,390  2/1967  Jamme .................................. 280/91

FOREIGN PATENT DOCUMENTS 772697  9/1971  Belgium .

OTHER PUBLICATIONS

Glencoe Automotive Technology Series, Second Edition, Suspension and Steering, p. 230, 1982.

Primary Examiner—Richard A. Bertsch
Attorney, Agent, or Firm—Mark Zovko

[57] ABSTRACT

Device for detecting clearance in the wheel suspension of a vehicle, comprising a frame, two wheel support plates mounted on said frame for rotation and movable during operation substantially in a horizontal plane, and drive means for moving said wheel support plates in opposing directions relative to one another over limited distances. The wheel plates are each mounted for rotation about a vertical axis and for lengthwise movement transversely of an imaginary connecting line between the two plates and that the drive means can cause these turning and lengthwise movements to occur independently of one another and either separately or simultaneously.

11 Claims, 2 Drawing Sheets

VEHICLE WHEEL SUSPENSION CLEARANCE DETECTOR

The invention relates to a device for detecting clearance in the wheel suspension of a vehicle, comprising a frame, two wheel support plates mounted on the frame for rotation and movable during operation substantially in a horizontal plane, and drive means for moving the wheel support plates in opposing directions relative to one another over limited distances.

Such a device is known from the Belgian patent specification 772.697. For the detecting of clearance in the wheel suspension a vehicle is placed with its front wheels on the wheel support plates forming part of a fixed test bay. Through actuating of the drive means the wheels are forced in opposing directions relative to one another so that clearance in wheel suspension points can be felt or seen.

A drawback of the known device is that it does not with certainty make apparent every clearance in the wheel suspension. Another drawback of this known device is that it is awkward to use and is bulky and expensive in construction.

The invention has for its object to provide a device of the type described in the preamble with which all possible clearances in a vehicle wheel suspension can be demonstrated with certainty and which can moreover be embodied in simple manner.

This object is achieved with a device according to the invention in that the wheel plates are each mounted both for rotation about a vertical axis and for lengthwise movement transversely of an imaginary connecting line between the two plates and that the drive means can cause these turning and lengthwise movements to occur independently of one another as well as either separately or simultaneously. As a result both longitudinal and rotational forces can be exerted on the wheels with the device and, when the wheels are placed on the plates outside the vertical axis, transverse forces as well. As a result of these various loading possibilities all the loadings occurring during driving can be exerted, so that all the possible clearances can be detected.

In preference the step as according to claim 2 is applied. Appreciable transverse forces can be exerted as a result, while it is well possible to continue generating the rotational loading, which is applied particularly in order to detect clearance in the steering means.

As will become apparent, it is possible as a result of the combination of the rotational mobility and the lengthwise mobility to manufacture the device in a simple and therefore economic manner. The device is thus brought within reach of the smaller companies with fewer financial resources which cannot normally invest in expensive fixed test bays.

In this respect the step from claim 3 is preferably applied. The whole device consists as a result of two separate units which can be set down in random position on a level ground or preferably on a vehicle hoist. These units can be portable. They can therefore be used by the appropriate authorities at random locations, for instance at a vehicle checkpoint.

A favourable embodiment is thereby characterized by the step from claim 4.

The device is thereby simple to operate when the step from claim 5 is employed.

An operationally secure and relatively maintenance-free construction is obtained with the step from claim 6.

The step from claim 7 is thereby applied in suitable manner.

As noted earlier the device according to the invention can take a simple form. Such a simple embodiment is achieved using the steps from claims 8 and 9. With the step from claim 8 is achieved that the points of application for the driving of the movement in lengthwise direction at the same time forms the point of rotation for the turning movement. Achieved with claim 9 is that the actuating arm for the turning movement simultaneously fulfills a longitudinal guiding function for the lengthwise movement.

The invention will be further elucidated in the following description with reference to the embodiments shown in the figures.

Figure 1:
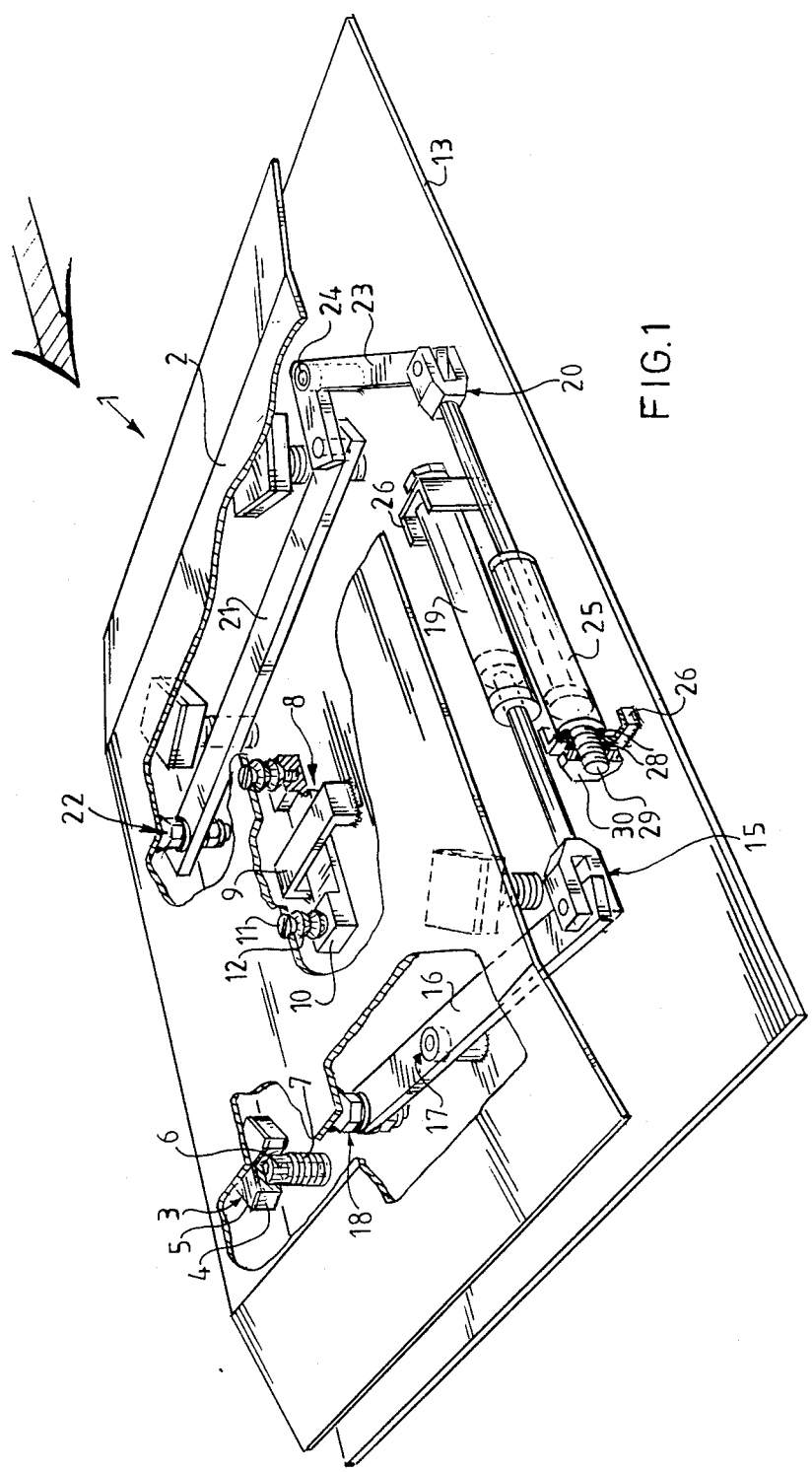
FIG. 1 shows in schematic, perspective view with broken away portions half of a device in accordance with an embodiment of the invention.
Figure 2:
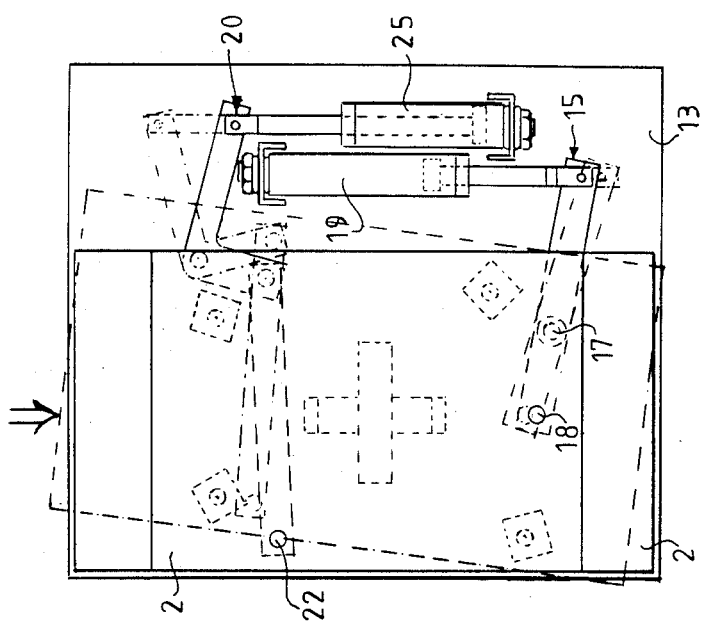
FIG. 2 shows the hole device schematically in top view.
Figure 4:
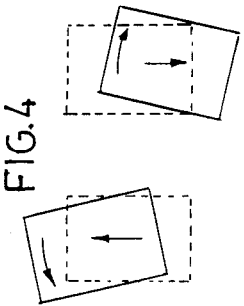
Figure 3:
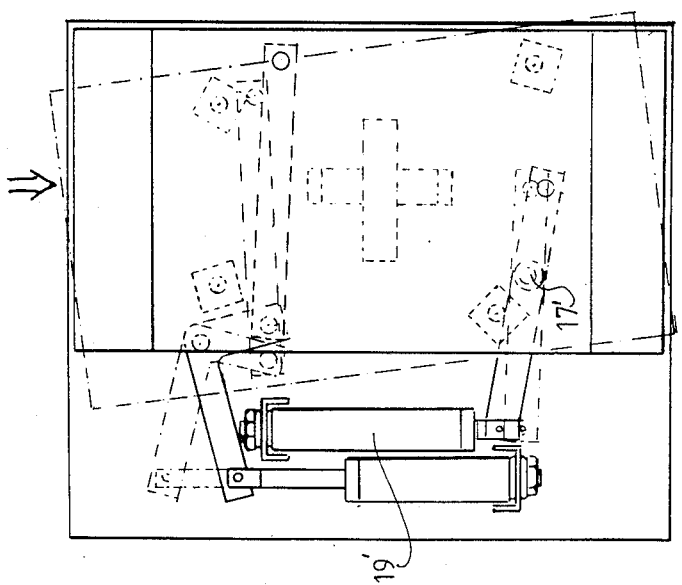

FIG. 3 and 4 elucidate in schematic form the movement potential of the wheel support plates of the device shown in FIG. 1 and 2.

The device 1 for detecting clearance in the wheel suspension of a vehicle comprises two wheel supporting units which in principle are in mirror-symmetrical form, and one of which is shown in FIG. 1.

The unit shown comprises a wheel supporting plate 2 which is mounted for horizontal movement in a horizontal plane on a frame plate 13. The bearing mounting is formed in the embodiment shown by four sliding pieces 3. Each of these gliding pieces comprises a metal block 4 having on its side facing towards the wheel plate 2 a layer of material with a small coefficient of friction, such as "TELFON" for instance. This block 4 is provided on its lower end with a recessing into which falls the head of a socket screw 6 screwed into the frame plate 13. Arranged around the shank of screwed 6 is a number of rings 7 so that the height of the head of the socket screw 6, and therefore of sliding piece 3, can be adjusted by adding or removing rings 7.

The wheel plate 2 also lies loosely on the sliding pieces 3 and is locked into the device by means of a locking construction 8. This comprises a lower bracket 9 welded in position or fastened with bolts onto the frame plate 13 and an upper bracket 10 gripping underneath this lower bracket 9. The upper bracket 10 is screwed against the underside of wheel plate 2 using bolts 11 with countersunk heads. Arranged about each bolt 11 between bracket 10 and the underside of wheel plate 2 is a number of spring washers 12. By turning the bolts 11 the height of the upper bracket 10 can be adjusted in simple manner such that it just does not make contact with lower bracket 9. In this manner the wheel plate 2 can therefore move freely in a horizontal plane over limited distances without thereby being able to come loose from the frame 13, while the sliding pieces moreover remain locked in a reliable fashion.

According to the invention the wheel plate 2 can perform a turning movement about a vertical axis as well as a lengthwise movement transversely of an imaginary connecting line between the two plates of the device. As will be seen from FIG. 2, this lengthwise movement is substantially from bottom left as seen in FIG. 1 to top right and back. The drive mechanism that can bring about this lengthwise movement is designated with 15. This lengthwise movement mechanism 15 comprises a lever 16 which is mounted for rotation at 17 to the frame plate 13 and at 18 to the wheel plate 2. Engaging with the other end of lever 16 for pivoting is a double-action pneumatic piston cylinder unit 19. This piston cylinder unit 19 is mounted at its other end on a support 26. The pivot point 18 comprises in the embodiment shown a bolt welded against the underside of wheel plate 2, which bolt protrudes through a bore-hole arranged in lever 16, and on the end of which a nut is fitted for locking purposes.

It will be apparent that when the piston rod of cylinder 19 is retracted the wheel plate 2 is thereby further determined by an arm 21 of the turning movement mechanism 20 to be described later. This arm 21 is connected for pivoting at 22 to the wheel plate 2 and, in the case where the turning movement mechanism 20 is not activated, ia supported immobile but capable of pivoting with its other end on a lever 23.

When the cylinder 19 is actuated and the pivot point 22 of wheel plate 2 will pivot around the other end of arm 21. In view of the comparatively great length of this arm 21 the wheel plate 2 hereby moves virtually parallel to itself.

The turning movement mechanism 20 comprises the above described arm 21 which is thus connected to the wheel plate 2 with its one end in the pivot point 22 and with its other end is connected for pivoting to a lever 23 which in turn is connected at 24 for pivoting to the frame plate 13. As is shown the lever 23 takes an angular form so that the actuating cylinder 25 for the turning movement mechanism 20 can be placed next to the actuating cylinder 19 for the lengthwise movement mechanism. The portion of the lever 23 extending between the hinge 24 connected to frame plate 13 and the hinge connection with the arm 21 extends substantially in the direction of lengthwise movement and substantially transversely of arm 21.

When now the cylinder 25 of the turning movement mechanism is actuating that the piston rod is pushed outward the lever 23 will turn, as seen in FIG. 1, antoclockwise, thereby pulling arm 21 to the right. This movement directed to the right is transmitted in the pivot point 22 onto the wheel plate 2.

In the case the lengthwise movement mechanism 15 is not actuated the pivot point 18 is held in fixed position by the lever 16. When the turning movement mechanism is actuated the wheel plate 2 therefore turns about this hinge connection 18.

The cylinders 19 and 25 are, as remarked earlier, double-action and can therefore slide both in and out with the application of force. Both the lengthwise movement and the turning movement can therefore be effected so as to be reciprocating. Since the cylinders 19 and 25 can be operated separately the lengthwise movement and the turning movement can be generated separately as well as jointly. The cylinders 19 and 25 are each mounted on a support 26 joined firmly to the frame plate 13. This support is furnished with a bore-hole through which protrudes a threaded end 29 of the cylinders. Screwed onto this treaded end is a nut 30. On either side of the support 26 an O-ring 28 is arranged around the threaded end 29, so that in the mounted position the cylinders are not completely fixed but have a limited mobility which is sufficient to absorb the limited angular rotation resulting from the connection to the respective levers 16 and 23 during the movement in and out thereof.

In FIG. 2 both units of the device according to the invention are shown next to one another. The right-hand unit has already been described in detail with reference to FIG. 1. The left-hand unit is embodied entirely mirror-symmetrically and does not therefore require further elucidation. In the position of use the two units are placed at an interval from one another such that two wheels of one shaft, particularly the forward shaft, can be placed on the respective wheel plates.

During checking of the wheel suspension for clearance the brake of the vehicle is set into operation. By then performing in suitable manner the synchronous actuation of the pneumatic cylinders of the lengthwise and turning movement mechanisms, the wheel may be loaded for reciprocal movement in lengthwise, transverse and rotation direction. Any clearance present can as a result be identified.

Although the right-hand unit takes a form that is mirror-symmetrical to the left-hand unit, the respective cylinders 19 and 19' of the lengthwise movement mechanism are connected in opposing directions, that is, the cylinder 19 of the right-hand unit is in extended state in the rest position while cylinder of the left-hand unit is retracted in the rest position So that the wheel plate is located in the rest position in the correct position relative to the frame plate the fixed pivot point 17' is displaced in appropriate manner with respect to the fixed pivot point 17 of the right-hand unit.

The actuating means for the device according to the invention comprise on the hand lengthwise movement actuating means which activate both the respective cylinders 19 and 19' for the lengthwise movement simultaneously but in opposing directions, as indicated schematically in FIG. 3.

The actuating means further comprise turning actuation means which actuate both cylinders 25 for the turning movement simultaneously and in the same direction. By extending of these cylinders the wheel plates swing away from one another about the respective pivot points 18 to the position indicated in FIG. 2 with dashed lines.

As a result of simultaneous actuation of both the lengthwise movement actuation means and the turning actuation means, these two movements may be combined, as shown schematically in FIG. 4. The various possible combinations of movements are described more extensively in the priority application.

In the actual embodiment the pneumatic cylinders are protected by a cover. The units of the device according to the invention can by used in the way shown in FIG. 2, whereby the cylinders are situated on the outside of the device. This disposition is particularly suitable when the device according to the invention is employed on a vehicle hoist.

It will be apparent that the different disposition of the cylinders is possible.

I claim:

1. Device for detecting clearance in the wheel suspension of a vehicle, comprising a frame, two wheel support plates mounted on said frame for rotation and movable during operation substantially in a horizontal plane, and drive means for moving said wheel support plates in opposing directions relative to one another over limited distances, characterized in that the wheel support plates are each mounted for rotation about a vertical axis and for lengthwise movement transversely of an imaginary connecting line between the two wheel support plates and that the drive means can cause these turning and lengthwise movements to occur independently of one another.

2. Device according to claim 1, characterized in that the wheel support plates are mounted for rotation about a vertical axis close to a forward end in the direction of the lengthwise movement.

3. Device according to claim 1, characterized in that the frame takes a split form and comprises a separate portion for each wheel support plate such that each wheel support plate forms a separate wheel support plate unit having an associated frame portion and the associated drive means.

4. Device according to claim 3, characterized in that the drive means of each week support plate unit comprise a separate double-action pneumatic piston cylinder unit for the driving of the turning movement and for the driving of the lengthwise movement.

5. Device according to claim 4, characterized in by actuating means comprising lengthwise movement actuation means which simultaneously actuate both cylinders for the lengthwise movement and turning actuation means which simultaneously actuate both cylinders for the turning movement.

6. Device according to one of the preceding claims, characterized in that each wheel support plate rests on sliding pieces protruding above the frame.

7. Device according to claim 6, characterized in that the sliding pieces are provided on their upper faces with a material having a coefficient of friction substantially equal to the coefficient of friction of PTFE.

8. Device as claimed in claim 4, characterized in that the lengthwise movement driving by said drive means is accomplished using a first lever mounted for rotation on the frame and wheel support plate, which first lever substantially extends transversely of the direction of lengthwise movement and whereof the pivot point with the wheel support plate defines the vertical axis for the turning movement of said drive means and whereby the pneumatic piston cylinder unit for the driving of the lengthwise movement grips onto the opposite end of the first lever.

9. Device as claimed in claim 8, characterized in that the turning movement driving by said drive means is accomplished using a second lever mounted for rotation on the frame, on one end of said second lever an arm extending transversely of the direction of lengthwise movement grips pivotally, said arm grips with its other end pivotally onto the wheel support plate and whereby at least the portion of said second lever between the pivot points of said second lever and the frame and the pivot point of said second lever and said arm extends substantially in the direction of lengthwise movement and that the pneumatic piston cylinder unit for the driving of the turning movement grips onto the opposite end of said second lever.

10. Device according to claim 9 characterized in that said second lever takes an angular form and the pneumatic piston cylinder units for driving of the lengthwise and turning movements are mounted adjacent to and parallel to one another on the frame.

11. Device according to claim 8 wherein the pneumatic piston cylinder units for driving of the lengthwise and turning movements are mounted adjacent to and parallel to one another on the frame.

* * * * *